United States Patent [19]

Bowen

[11] 3,962,593

[45] June 8, 1976

[54] ELECTROMAGNETIC MOTOR

[75] Inventor: James H. Bowen, Atlanta, Ga.

[73] Assignee: BDH, Inc., Rome, Ga.

[22] Filed: Apr. 1, 1975

[21] Appl. No.: 564,139

[52] U.S. Cl. .................................. 310/46; 310/114; 310/231

[51] Int. Cl.² .......................................... H02K 7/20

[58] Field of Search ............... 310/40, 46, 219, 231, 310/156, 112, 114, 122; 318/230

[56] References Cited
UNITED STATES PATENTS

| | | | |
|---|---|---|---|
| 411,030 | 9/1889 | Hirliman | 310/46 |
| 1,872,313 | 8/1932 | Masterson | 310/46 |
| 2,347,590 | 4/1944 | Binder | 310/231 UX |
| 2,697,192 | 12/1954 | Wiley | 310/231 UX |
| 3,751,698 | 8/1973 | Walker | 310/231 X |
| 3,870,914 | 3/1975 | Walker | 310/231 X |

Primary Examiner—Donovan F. Duggan
Attorney, Agent, or Firm—Clarence A. O'Brien; Harvey B. Jacobson

[57] ABSTRACT

An electromagnetic impulse motor having a stator and a rotor arranged for rotation relative to the stator. Permanent magnets are mounted on either the rotor or stator, while electromagnets are mounted on the other of the rotor and stator in order to cooperate the permanent magnets. A variable speed motor actuates a timing disc to pulse the electromagnets as a function of the speed of the variable speed motor to control the speed of rotation of the rotor of the electromagnetic motor.

6 Claims, 4 Drawing Figures

ELECTROMAGNETIC MOTOR

BACKGROUND OF THE INVENTION

1. Field of the Invention

This invention relates generally to electric motors, and particularly to a variable speed electromagnetic impulse motor.

2. Description of the Prior Art

Electromagnetic motors are well known and have been long proposed. See, for example, U.S. Pat. Nos. 127,369, issued May 28, 1872 to W. H. Richardson, and 722,042, issued Mar. 3, 1903 to Angel Pol Y Aguirre. These known electromagnetic motors generally propose to use permanent magnets as a stationary field and intermittently energize rotating electromagnets which interact with the permanent magnets to cause rotation of the rotor of the motor. The intermittent energizing of the electromagnets is conventionally achieved as by using the rotor of the motor as a timing disc, which creates speed control problems. Accordingly, these known electromagnetic motors are generally single speed affairs, as is the case with the impulse motor disclosed in U.S. Pat. No. 1,764,921, issued June 17, 1930 to A. Wiedner. The device of the latter mentioned reference arranges the electromagnets in a stationary field, with the permanent magnets being mounted on the armature.

U.S. Pat. No. 2,922,943, issued Jan. 26, 1960 to H. Rupp, discloses an impulse motor that proposes to provide variable speed operation by use of an oscillating tank circuit which controls the duration of pulses sent to the electromagnets of the motor. This approach, however, is limited in use since the tank circuit employed must be capable of withstanding the electrical power being supplied to the electromagnets of the impulse motor.

SUMMARY OF THE INVENTION

It is an object of the present invention to provide an electromagnetic impulse motor having a light-weight, yet rugged and reliable, construction when compared to known motors of this kind.

It is another object of the present invention to provide an electromagnetic impulse motor capable of variable speed operation on either AC or DC current over a wide range of power requirements.

These and other objects are achieved according to the present invention by providing an electromagnetic impulse motor having: a stator; a rotor arranged for rotation relative to the stator and cooperating with the stator to form a rotor-stator assembly; a permanent magnet mounted on one of the stator and rotor; an electromagnet mounted on the other of the stator and rotor for impulsing the permanent magnet and causing rotation of the rotor; and a variable speed timing assembly electrically connected to the electromagnet for pulsing the latter as a function of the speed of the variable speed timing arrangement and controlling the speed of rotation of the rotor.

The stator preferably includes a framework constructed from a non-magnetic material, while the rotor can include a shaft rotatably mounted in the framework and a plurality of flywheels mounted on the shaft for rotating same. The flywheels are advantageously constructed from a non-magnetic material, with the permanent magnet being a plurality of permanent magnets mounted on the peripheries of the flywheels.

The electromagnet is advantageously a plurality of sets of electromagnets mounted on the stator frame adjacent the periphery of the flywheels. One of the sets of electromagnets is associated with a respective one of the flywheels, and the number of electromagnets in each set is advantageously the same as the number of permanent magnets provided on the flywheel associated with the particular set of electromagnets.

A preferred form of the timing arrangement advantageously includes a variable speed motor, such as a DC motor, having a timing disc mounted on the output shaft of the variable speed motor. The timing disc has a plurality of contact segments electrically connected to a source of electricity, AC or DC, and equal in number to the sets of electromagnets. A plurality of pairs of brushes are arranged for having one of the brushes of each pair intermittently contact the contact segments in order to complete a circuit through a set of electromagnets to which the particular pair of brushes are electrically connected. The other of the brushes of each pair are advantageously in contact with, for example, a ground or negative terminal of a power source.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
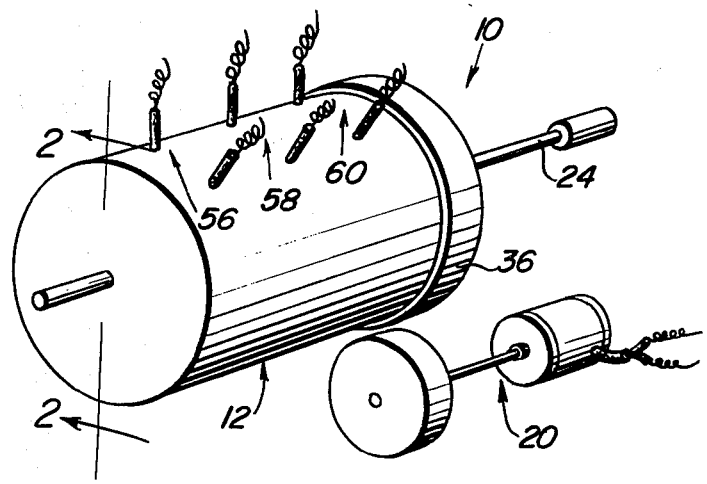
FIG. 1 is a perspective view showing an electromagnetic impulse motor according to the present invention.
Figure 2:
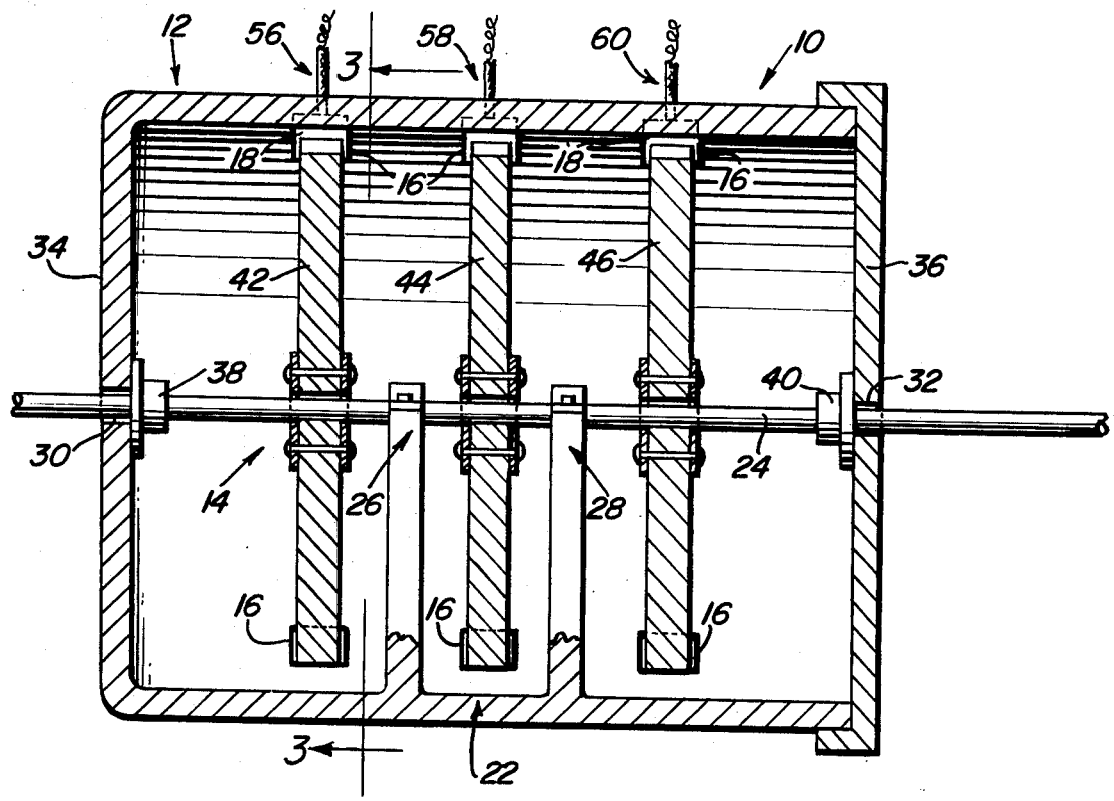
FIG. 2 is a fragmentary, sectional view taken generally along the line 2—2 of FIG 1, but drawn to a larger scale than FIG. 1.
Figure 3:
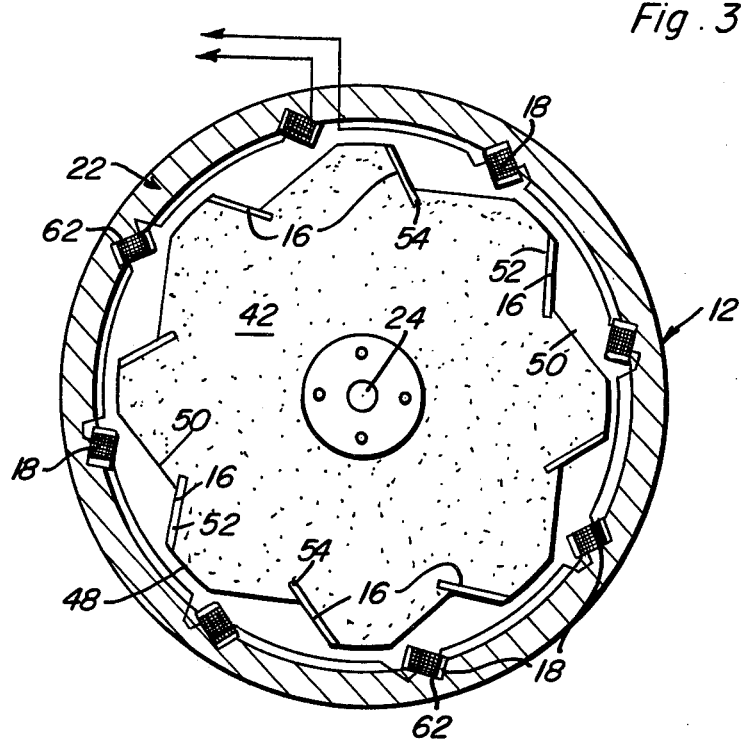
FIG. 3 is a sectional view taken generally along the line 3—3 of FIG. 2.

Referring now more particularly to FIGS. 1 through 3 of the drawings, an electromagnetic impulse motor 10 according to the present invention includes a stator 12 and a rotor 14 which is arranged for rotation relative to stator 12 and cooperates with stator 12 to form a rotor-stator assembly. A plurality of permanent magnets 16 are mounted on one of stator 12 and rotor 14, with rotor 14 being illustrated as provided with magnets 16, and a plurality of electromagnets 18 are mounted on the other of stator 12 and rotor 14, with stator 12 being illustrated as provided with the electromagnets 18, for impulsing permanent magnet 16 and causing rotation of rotor 14.

A variable speed timing assembly 20 is electrically connected to electromagnets 18 for pulsing the latter as a function of the speed of the timing assembly 20 and controlling the speed of rotation of rotor 14. The construction of timing assembly 20 and the manner in which assembly 20 is electrically connected to the electromagnets 18 will be described in greater detail below.

Stator 12 includes a frame constructed from a non-magnetic material, as are well known, and is advantageously in the form of the illustrated generally cylindrical housing 22. A shaft 24 is rotatably mounted in housing 22 as by the illustrated conventional bearings 26 and 28 arranged on elements extending into the interior of housing 22 from the cylindrical wall thereof. Further, as perhaps can best be seen from FIG. 2 of the drawings, shaft 24 extends through holes 30 and 32 provided in housing 22, with hole 30 being provided in an end wall 34 of housing 22 and hole 32 being provided in a removable end cap 36 of the housing 22. Collars 38 and 40 are affixed to shaft 24 to limit longitudinal movement of shaft 24 with respect to end wall 34 and end cap 36.

A plurality of flywheels 42, 44, and 46, each having a periphery 48, are mounted on shaft 24 for rotation with the shaft. Each of the flywheels 42, 44, and 46 is constructed from a non-magnetic material, and permanent magnets 16 are mounted on the peripheries 48 of these flywheels.

Further, each of the flywheels 42, 44, and 46 is advantageously in the form of a disc whose periphery 48 is provided with a plurality of notches 50 equally spaced around the periphery 48 and forming seats 52 for the permanent magnets 16. It will be appreciated that the latter are advantageously in the form of rectangular members which slip into the grooves 54 provided in the notches 50 to form part of the seats 52 which receive the permanent magnets 16. Although seats 52 provided with grooves 54 have been illustrated as being provided for receiving the permanent magnets 16, it will be appreciated that the permanent magnets 16 can be attached to the periphery 48 of the flywheel 42, 44, 46 in any suitable, known manner. It is advantageous, however, that the permanent magnets be orientated in a manner such as shown in, for example, FIG. 3 of the drawings. Further, while three flywheels 42, 44, 46 have been illustrated, it will be understood that different numbers of flywheels may be employed as desired, although the use of three flywheels presents certain advantages in balancing rotor 14 so as to assure smooth running of motor 10.

Electromagnets 18 are divided up into a plurality of series-connected sets 56, 58, and 60 arranged around the inner surface of the circle wall of housing 22 so as to form a series of annuluses within housing 22. While the electromagnets 18 are illustrated as being disposed within recesses 62 provided in the inner wall of housing 22, it will be appreciated that other suitable ways of mounting the electromagnets may be employed as desired. Further, the electromagnets 18 are arranged so as to be adjacent the periphery of the flywheels 42, 44, 46, with each one of the sets 56, 58, 60 being associated with a respective one of the flywheels 42, 44, 46. The number of electromagnets 18 in each set 56, 58, 60 is advantageously the same as the number of notches 50 and permanent magnets 16 provided on a flywheel 42, 44, 46 associated with the particular set 56, 58, 60.

Figure 4:
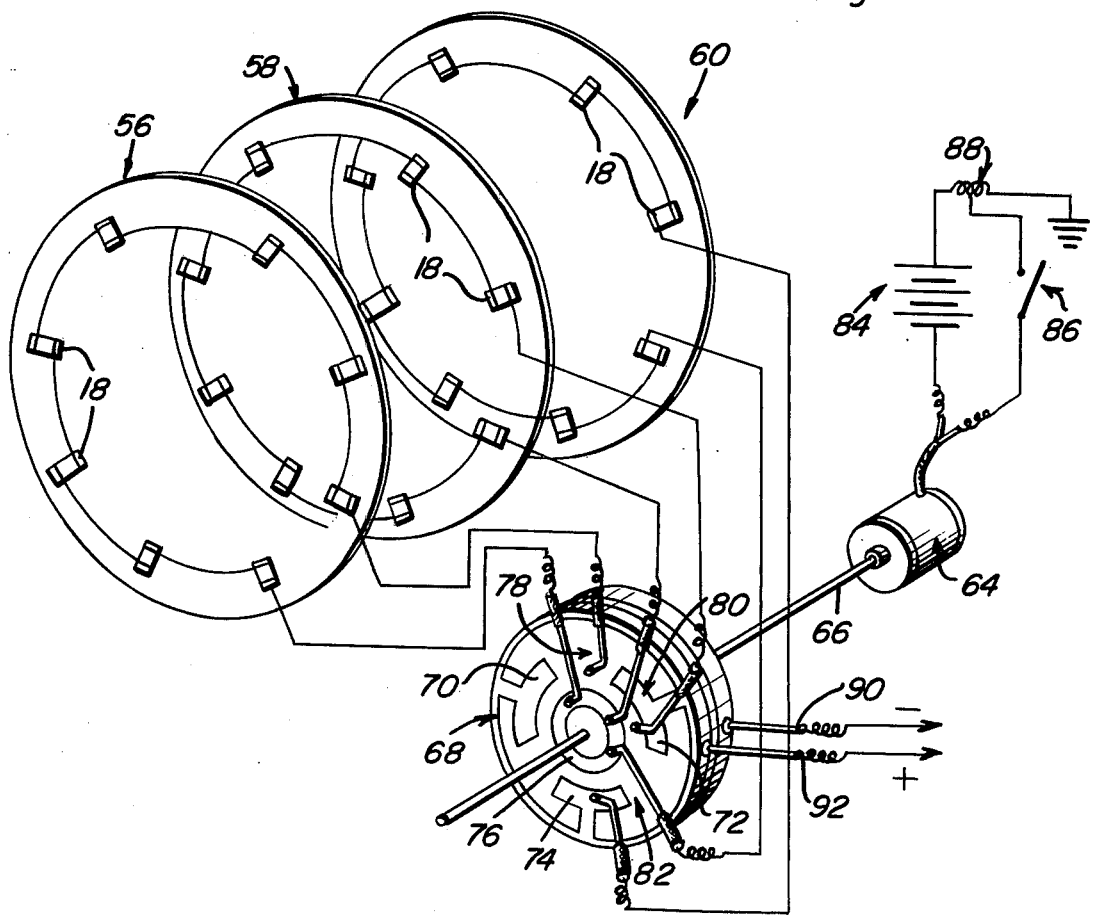
FIG. 4 is a schematic view showing the wiring diagram for an electromagnetic impulse motor according to the present invention.

Referring now more particularly to FIG. 4 of the drawings, the timing assembly 20 advantageously includes a variable speed motor 64 having, in the conventional manner, an output shaft 66. Motor 64 may be, for example, a conventional DC electric motor capable of running off of the well known dry cell batteries such as employed in flashlights, and the like. A timing disc 68 is mounted on the output shaft 66 of motor 64 so as to be rotated by shaft 66, and is provided with a plurality of contact segments 70, 72 and 74 equal in number to the number of sets 56, 58 and 60. Accordingly, three contact segments are shown in FIG. 4. Further, a contact ring 76 is provided on timing disc 68 to act as a ground contact or a contact leading to the positive or negative side of an appropriate power source.

Timing assembly 20 further includes a plurality of brush pairs 78, 80, and 82 arranged for intermittently contacting with one brush of the pair the contact segments 70, 72, and 74. Each one of the brush pairs 78, 80, and 82 is electrically connected to an associated, respective one of the series-connected sets 56, 58, and 60 of electromagnets 18 for energizing the electromagnets 18 of the particular set whenever the contact segments 70, 72, and 74 wipes the associated brush of the connected brush pairs 78, 80, 82. Further, the other brush of each brush pair 78, 80, 82 is, for example, in continuous contact with contact ring 76 so that a circuit will be completed through the sets 56, 58, 60 whenever the one of the brushes electrically connected to the sets is in engagement with one of the contact segments 70, 72, and 74.

Since, as mentioned above, motor 64 is preferably a DC motor, motor 64 may be connected in series with a conventional battery 84 and a conventional on-off switch 86 which functions effectively to start and stop motor 10. When switch 86 is moved to a position closing the circuit between battery 84 and motor 64, shaft 66 of motor 64 will commence rotating disc 68 and electromagnets 18 will be intermittently energized as a function of the speed of rotation of motor 64, which speed of rotation is advantageously controlled in a conventional manner as by the use of a rheostat 88. Whenever the shorter of the brushes in each brush pair 78, 80, and 82 contacts one of the contact segments 70, 72, and 74, a circuit will be completed to the set 56, 58, 60 associated with the particular brush pair from a power source connected to timing disc 68 as by the wires 90 and 92. Since, as will be appreciated from a study of, for example, FIG. 3 of the drawings, the permanent magnets 16 and electromagnets 18 are arranged so that there are only attractive forces between the two sets of magnets 16, 18, and no repulsive forces, it is immaterial whether the power source to which wires 90 and 92 are connected is an AC source or DC source. Further, smooth running of motor 10 is assured by arrangement of the plurality of sets of electromagnets on rotor 14 whereby, with proper arrangement of brush pairs 78, 80, and 82, one of the sets of electromagnets is being pulsed at all times.

As will be appreciated from the above description and from the drawings, motor 10 provides an electromagnetic impulse motor whose speed of rotation may be easily controlled as by the conventional rheostat 88. Further, the motor may run on whatever electric power is available, AC and DC, with the power source for motor 64 being self-contained with the overall motor 10. It will be appreciated, of course, that nickel-cadmium and other rechargeable batteries may be built into a motor 10, or more specifically the timing assembly 20 thereof, and a conventional charging circuit (not shown) built into the motor system so as to use the current being supplied to wires 90 and 92 to either recharge the rechargeable battery or to replace the battery by functioning as a power source for motor 64.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An electromagnetic impulse motor, comprising, in combination:

a stator;

a rotor arranged for rotation relative to the stator and cooperating with the stator to form a stator-rotor assembly;

a permanent magnet mounted on the rotor;

electromagnet means mounted on the stator for impulsing the permanent magnet and causing rotation of the rotor; and variable speed timing means electrically connected to the electromagnet means for pulsing the latter as a function of the speed of the variable speed timing means and controlling the speed of rotation of the rotor, the stator including a framework constructed from a non-magnetic material, the rotor including a shaft rotatably mounted on the framework, a plurality of flywheels having peripheries and being mounted on the shaft for rotating same, the flywheels being constructed from a non-magnetic material, the permanent magnet being a plurality of permanent magnets mounted on the peripheries of the flywheels, each of the flywheels being a disc having a periphery provided with a plurality of notches equally spaced around the periphery of a groove at the apex of each notch, the notches forming seats for the permanent magnets with a portion of each permanent magnet being held in the groove associated with the respective notch, the permanent magnets and electromagnets being advantageously with opposite poles thereof adjacent one another for creating only attraction forces between the permanent magnets and electromagnets.

2. A structure as defined in claim 1, wherein the electromagnet means includes a plurality of sets of electromagnets mounted on the frame adjacent the rotor, each one of the sets of electromagnets being associated with a respective one of the flywheels, and the number of electromagnets in each set being the same as the number of permanent magnets provided on the associated flywheel.

3. A structure as defined in claim 2, wherein the timing means includes, in combination:

1. an entirely separate variable speed motor having an output shaft;

2. a timing disc mounted on the output shaft of the variable speed motor and provided with a plurality of contact segments electrically connected to a source of electricity and equal in number to the sets of electromagnets; and 3. a plurality of brush means arranged for intermittently contacting the contact segments, each one of the brush means being electrically connected to an associated, respective one of the sets of electromagnets for energizing the electromagnets whenever the contact segments are wiped by one of the brush means.

4. An electromagnetic impulse motor, comprising, in combination:

a. a stator;

b. a rotor arranged for rotation relative to the stator and cooperating with the stator to form a stator-rotor assembly;

c. a permanent magnet mounted on one of the stator and rotor;

d. electromagnet means mounted on the other of the stator and rotor for impulsing the permanent magnet and causing rotation of the rotor;

e. variable speed timing means electrically connected to the electromagnet means for pulsing the latter as a function of the speed of the variable speed timing means and controlling the speed of rotation of the rotor, and the electromagnet means includes a plurality of sets of electromagnets, the electromagnets of each set connected in series to one another, and the timing means includes, in combination:

1. an entirely separate variable speed motor having an output shaft;

2. a timing disc mounted on the output shaft of the variable speed motor and provided with a plurality of contact segments electrically connected to a source of electricity and equal in number to the sets of electromagnets; and 3. a plurality of brush means arranged for intermittently contacting the contact segments, each one of the brush means being electrically connected to an associated, respective one of the sets of electromagnets for energizing the electromagnets whenever the contact segments are wiped by one of the brush means.

5. A structure as defined in claim 4, wherein the said variable speed motor is connected to a direct current battery for the source of energization thereof which is entirely separate and distinct from the said source of electricity of the said contact segments.

6. A structure as defined in claim 5, wherein the said direct current battery is of the nickel-cadmium type.

* * * * *